US010334147B2

(12) United States Patent
Nakajima

(10) Patent No.: US 10,334,147 B2
(45) Date of Patent: Jun. 25, 2019

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Masaki Nakajima, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 148 days.

(21) Appl. No.: 15/183,583

(22) Filed: Jun. 15, 2016

(65) Prior Publication Data

US 2016/0373628 A1 Dec. 22, 2016

(30) Foreign Application Priority Data

Jun. 18, 2015 (JP) .................................. 2015-123161

(51) Int. Cl.
*H04N 5/21* (2006.01)
*H04N 5/58* (2006.01)
(Continued)

(52) U.S. Cl.
CPC ........... *H04N 5/2256* (2013.01); *G01B 11/02* (2013.01); *G01B 11/25* (2013.01); *G06T 7/521* (2017.01);
(Continued)

(58) Field of Classification Search
CPC ...... H04N 5/2256; H04N 5/21; H04N 5/2354; H04N 5/58; H04N 5/66; G06T 7/521; G01B 11/02; G01B 11/25
(Continued)

(56) References Cited

U.S. PATENT DOCUMENTS 6,268,918 B1   7/2001  Tanabe et al.
2005/0007487 A1*  1/2005  Miyoshi ................. G01B 11/25
                                                    348/362
(Continued)

FOREIGN PATENT DOCUMENTS

CN   101193210 A   6/2008
CN   102954770 A   3/2013
(Continued)

*Primary Examiner* — Jefferey F Harold
*Assistant Examiner* — Mustafizur Rahman
(74) *Attorney, Agent, or Firm* — Canon USA, Inc., IP Division

(57) ABSTRACT

To perform high-accuracy shape measurement even when an appropriate exposure amount is not obtained by being set to an integral multiple of a flickering period of ambient light, an information processing apparatus includes a determination unit configured to determine whether an exposure time of an image capturing apparatus in performing three-dimensional measurement of a target object is set to an integral multiple of a flickering period of the ambient light, a control unit configured to perform control to set, when the determination unit determines that the exposure time is set to the integral multiple of the flickering period of the ambient light, the exposure time to the integral multiple of the flickering period of the ambient light, and a measurement unit configured to control a projection apparatus and the image capturing apparatus based on a control result by the control unit to the perform three-dimensional measurement of the target object.

12 Claims, 9 Drawing Sheets

(51) Int. Cl.
  *H04N 5/66* (2006.01)
  *G01B 11/02* (2006.01)
  *G01B 11/25* (2006.01)
  *G06T 7/521* (2017.01)
  *H04N 5/225* (2006.01)
  *H04N 5/235* (2006.01)

(52) U.S. Cl.
  CPC ............. *H04N 5/21* (2013.01); *H04N 5/2354* (2013.01); *H04N 5/58* (2013.01); *H04N 5/66* (2013.01); *H04N 5/2357* (2013.01)

(58) Field of Classification Search
  USPC ....... 348/136, 135, 137, 140, 142, 169, 174, 348/180, 221.1, 226.1, 227.1, 243, 297, 348/329, 333.1, 366, 370, 372, 447, 602, 348/719, 744, 64, 50, 49, 48, 47, 44, 34, 348/25, 362, 73, 234, 236, 238, 750, 801; 345/6, 20, 63, 77, 156, 419, 589, 690; 356/492, 496, 620; 382/103, 174, 285
  See application file for complete search history.

(56) References Cited

U.S. PATENT DOCUMENTS

| | | | |
|---|---|---|---|
| 2005/0030416 A1* | 2/2005 | Kametani | G03B 15/05 348/370 |
| 2007/0247531 A1* | 10/2007 | Deng | H04N 5/2351 348/226.1 |
| 2010/0091301 A1* | 4/2010 | Masuda | G01B 11/2545 356/601 |
| 2010/0289946 A1* | 11/2010 | Hung | H04N 7/0132 348/447 |
| 2011/0032381 A1* | 2/2011 | Nara | H04N 5/2353 348/229.1 |
| 2011/0157415 A1* | 6/2011 | Goh | H04N 5/2357 348/226.1 |
| 2011/0187859 A1* | 8/2011 | Edelson | H04N 5/2351 348/143 |
| 2011/0261347 A1 | 10/2011 | Kassamakov | |
| 2012/0033038 A1* | 2/2012 | Cho | H04N 13/128 348/43 |
| 2012/0162385 A1* | 6/2012 | Park | H04N 13/254 348/47 |
| 2012/0236174 A1* | 9/2012 | Kinrot | H04N 5/2357 348/226.1 |
| 2012/0236175 A1* | 9/2012 | Kinrot | H04N 5/2256 348/226.1 |
| 2012/0307106 A1* | 12/2012 | Spears | H04N 5/2357 348/227.1 |
| 2013/0033418 A1* | 2/2013 | Bevilacqua | G06F 3/017 345/156 |
| 2013/0050462 A1* | 2/2013 | Watanabe | G03B 15/02 348/77 |
| 2013/0229526 A1* | 9/2013 | Matsuno | H04N 5/332 348/164 |
| 2014/0320633 A1* | 10/2014 | Haugen | G01N 21/956 348/87 |
| 2015/0022693 A1* | 1/2015 | Appia | H04N 5/2355 348/239 |
| 2015/0138513 A1* | 5/2015 | Ichieda | H04N 9/3185 353/70 |
| 2015/0195487 A1* | 7/2015 | Liu | H04N 5/21 348/447 |
| 2015/0199031 A1* | 7/2015 | Baek | G06F 3/017 345/156 |
| 2015/0304638 A1* | 10/2015 | Cho | G01S 17/89 348/46 |
| 2015/0371093 A1* | 12/2015 | Tamura | G06T 7/593 382/103 |
| 2016/0269656 A1* | 9/2016 | Tao | H04N 5/3532 |
| 2016/0275443 A1* | 9/2016 | Hosokane | G06K 19/06037 |
| 2017/0111628 A1* | 4/2017 | Fan | H04N 13/254 |
| 2017/0134634 A1* | 5/2017 | Jin | H04N 5/2357 |

FOREIGN PATENT DOCUMENTS

| | | |
|---|---|---|
| CN | 104601899 A | 5/2015 |
| DE | 102012106286 A1 | 2/2013 |
| EP | 2607840 A1 | 6/2013 |
| JP | 2008-224808 A | 9/2008 |
| JP | 2010-133712 A | 6/2010 |
| JP | 2012-154828 A | 8/2012 |
| JP | 2015-087243 A | 5/2015 |

* cited by examiner

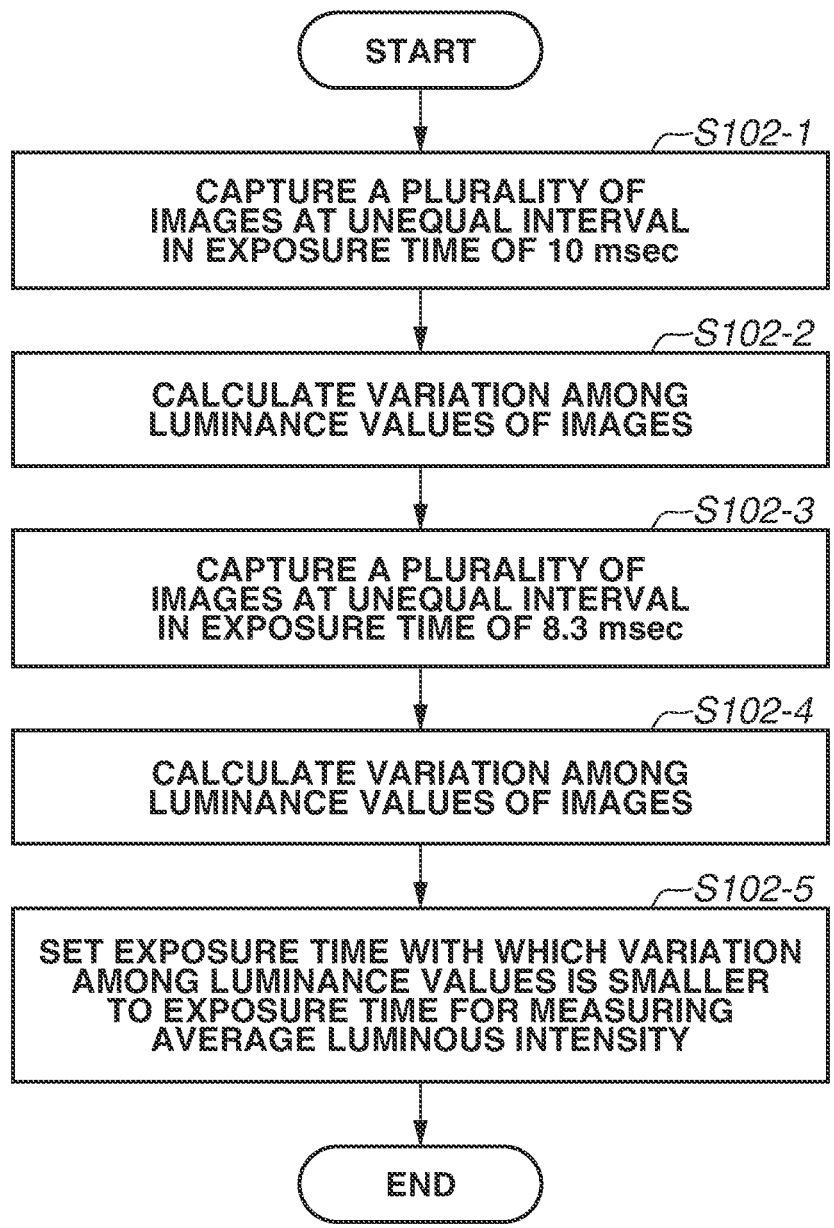

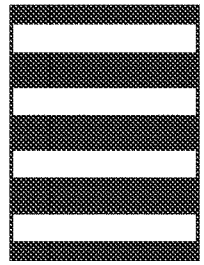 FIG.4A ALL LIGHTING PATTERN
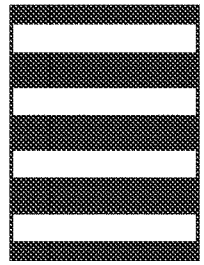 FIG.4B 1-BIT POSITIVE PATTERN
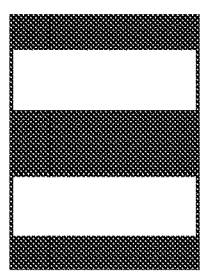 FIG.4C 2-BIT POSITIVE PATTERN
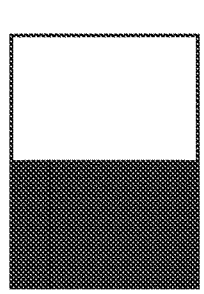 FIG.4D 3-BIT POSITIVE PATTERN
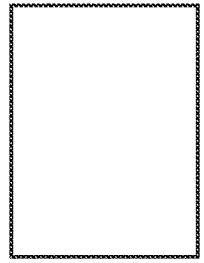 FIG.4E 4-BIT POSITIVE PATTERN
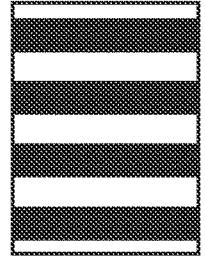 FIG.4F ALL LIGHTS-OUT PATTERN
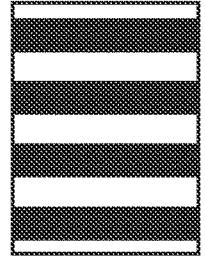 FIG.4G 1-BIT NEGATIVE PATTERN
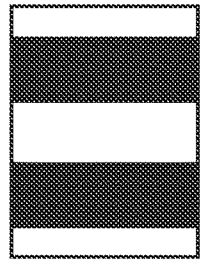 FIG.4H 2-BIT NEGATIVE PATTERN
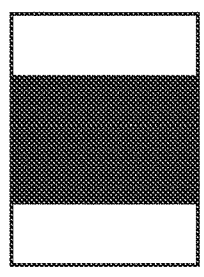 FIG.4I 3-BIT NEGATIVE PATTERN
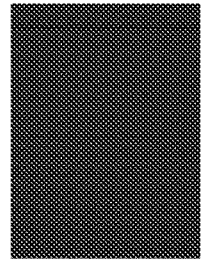 FIG.4J 4-BIT NEGATIVE PATTERN

INFORMATION PROCESSING APPARATUS, INFORMATION PROCESSING METHOD, AND STORAGE MEDIUM

BACKGROUND OF THE INVENTION

Field of the Invention

The present disclosure generally relates to information processing and, more particularly, to an information processing apparatus, an information processing method, a storage medium, and a method for measuring a three-dimensional shape of a measurement target by capturing an image of the measurement target.

Description of the Related Art

There is a three-dimensional shape measurement method for capturing an image of an object to be inspected (hereinbelow, referred to as an inspection target object) with a camera and measuring a shape of the inspection target object from a captured image. In such a method, when a light source existing around the inspection target object includes flickering, one or more captured images differ in brightness, so that the shape of the inspection target object may not be measurable with high accuracy.

To solve such an issue, in the technique discussed in Japanese Patent Application Laid-Open No. 2012-154828, an exposure time is set to an integral multiple of a flickering period in image capturing using automatic focusing in an image measurement device, and the luminous frequency of an illumination device is set to integral multiple of 50 Hz or 60 Hz. With this setting, the effect of a flicker is removed while a variation in exposure amount occurring due to flickering of illumination light is removed, to implement high-accuracy focus position measurement.

However, in a method discussed in Japanese Patent Application Laid-Open No. 2012-154828, even if a variation in brightness during image capturing is removed by setting the luminous frequency of the illumination light to the integral multiple of the flickering period, an exposure amount appropriate for measurement may not be obtained.

SUMMARY OF THE INVENTION

According to an aspect of the present disclosure, an information processing apparatus configured to perform three-dimensional measurement of a target object, onto which a predetermined pattern is projected by a projection apparatus, based on an image captured by an image capturing apparatus under ambient light flickering in a predetermined period, includes a determination unit configured to determine whether an exposure time of the image capturing apparatus in performing the three-dimensional measurement of the target object is set to an integral multiple of a flickering period of the ambient light, a control unit configured to perform control to set, when the determination unit determines that the exposure time of the image capturing apparatus is set to the integral multiple of the flickering period of the ambient light, the exposure time to the integral multiple of the flickering period of the ambient light, and a measurement unit configured to control the projection apparatus and the image capturing apparatus based on a control result by the control unit to perform the three-dimensional measurement of the target object.

According to the present disclosure, a shape of an inspection target object can be measured with high accuracy even if a flicker exists in ambient light.

Further features of the present disclosure will become apparent from the following description of exemplary embodiments with reference to the attached drawings.

BRIEF DESCRIPTION OF THE DRAWINGS

FIG. 3 illustrates a method for setting an exposure time in measuring a luminous intensity of ambient light according to an exemplary embodiment of the present disclosure.

FIG. 4A to 4J illustrates an example of pattern light to be projected in a shape measurement method according to an exemplary embodiment of the present disclosure.

DESCRIPTION OF THE EMBODIMENTS

Various exemplary embodiments of the present disclosure will be described below with reference to the drawings.

Figure 1:
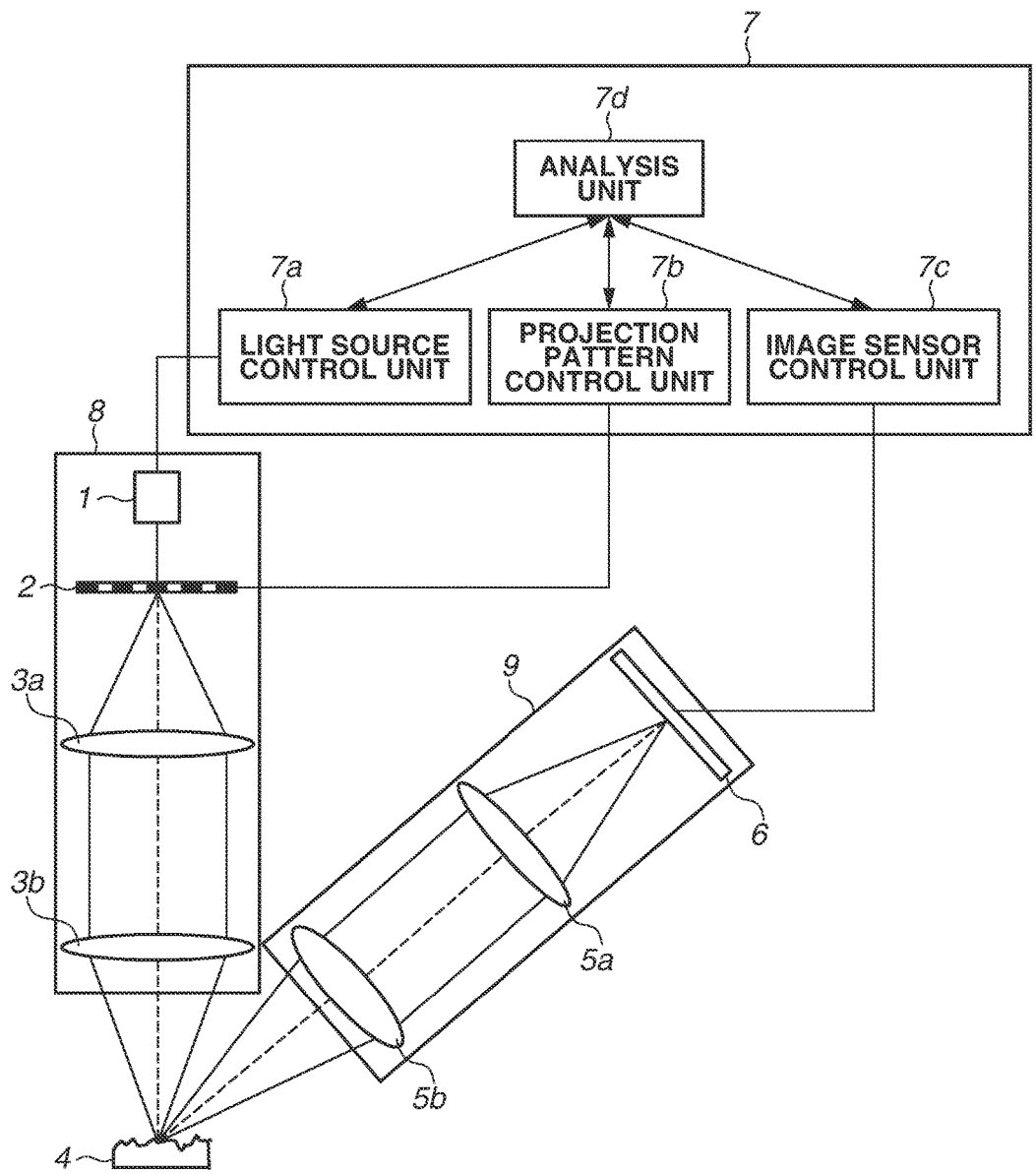
FIG. 1 is a diagram illustrating a system using an information processing apparatus according to an exemplary embodiment.

FIG. 1 illustrates a three-dimensional measurement apparatus according to an exemplary embodiment of the present disclosure. The three-dimensional measurement apparatus includes an information processing apparatus 7, a projection apparatus 8, and an image capturing apparatus 9.

Each of units constituting the projection apparatus 8 will be described.

A light source 1 is, for example, a light emitting diode (LED) that emits a light flux. A pattern generation unit 2 generates a pattern to be projected onto an inspection target object 4, and modulates the pattern. In the present exemplary embodiment, a lattice pattern in which light portions and dark portions are periodically arranged is generated as the pattern to be projected onto the inspection target object 4. While a mask pattern in which light shielding portions and light unshielding portions are regularly arranged may be used as the pattern generation unit 2, any pattern such as a monochrome pattern or a sinusoidal pattern may be generated by using a liquid crystal element or a digital mirror device (DMD). Projection lenses 3a and 3b is used to irradiate the inspection target object 4 with pattern light.

Next, each of units constituting the image capturing apparatus 9 will be described below.

Collective lenses 5a and 5b collect the pattern light reflected from the inspection target object 4. An image sensor 6 acquires the intensity of a light flux dispersed and reflected from the inspection target object 4. The image sensor 6 can include a charge-coupled device (CCD) sensor or a complementary metal oxide semiconductor (CMOS) sensor.

Figure 9:
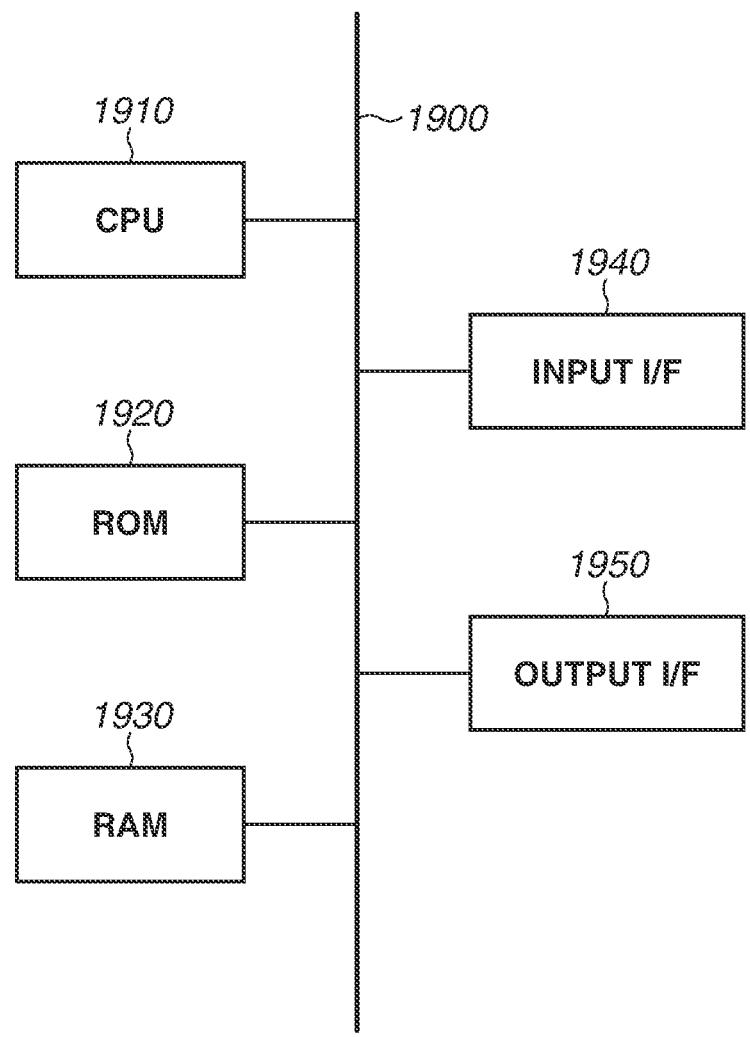
FIG. 9 illustrates an example of a hardware configuration of an information processing apparatus according to an exemplary embodiment of the present disclosure.

The information processing apparatus 7 controls light emission from the light source 1 and the pattern to be projected by the pattern generation unit 2 and an exposure time and a gain of the image sensor 6, to calculate a shape of the inspection target object 4 from intensity information about the light flux obtained from the image sensor 6. FIG. 9 is a diagram illustrating a hardware configuration of an information processing apparatus 7 according to the present invention. In FIG. 9, an information processing apparatus 7 comprises a central processing unit (CPU) 1910, a bus 1900, a read only memory (ROM) 1920, a random access memory (RAM) 1930, and executed by the CPU 1910, an input interface (I/F) 1940 and an output I/F 1950. Each of functional units constituting the information processing apparatus 7 is implemented when a central processing unit (CPU) 1910 loads a program stored in a read-only memory (ROM) 1920 into a random access memory (RAM) 1930, as illustrated in FIG. 9, and performs processing according to each of flowcharts, described below. If hardware is configured as an alternative to software processing using the CPU 1910, for example, a calculation unit or a circuit corresponding to processing of each of the functional units described below may be configured.

Each of units constituting the information processing apparatus 7 will be described below.

A light source control unit 7a controls a luminous intensity and a light emission time of the light source 1.

A projection pattern control unit 7b controls a change of the pattern to be projected by the pattern generation unit 2.

An image sensor control unit 7c changes an exposure time of the image sensor 6 and controls the image capturing apparatus 9 to capture an image. The image sensor control unit 7c acquires the image captured by the image capturing apparatus 9.

An analysis unit 7d acquires the image captured by the image capturing apparatus 9 via the image sensor control unit 7c, compares a luminous intensity of a flickering light source (a light source that emits ambient light) and an intensity of illumination light, determines whether the exposure time is set to an integral multiple of a predetermined flickering period, and calculates a shape of the inspection target object 4. More specifically, the image sensor 6 performs, while changing the luminous intensity set by the light source control unit 7a and the pattern light to be projected onto the inspection target object 4 set by the projection pattern control unit 7b, image capturing an intensity of the projected pattern light (pattern) a plurality of times, based on the exposure time and the gain set by the image sensor control unit 7c. The analysis unit 7d measures a three-dimensional shape of the inspection target object 4 from a geometrical relationship between the pattern generation unit 2 and the image sensor 6 based on a plurality of images captured by the image sensor 6.

In the present exemplary embodiment, an apparatus using a space coding pattern projection method for projecting pattern light onto the inspection target object 4 in measuring a three-dimensional shape of the inspection target object 4, and measuring a shape of the inspection target object 4 from a shift in a pattern position will be described. However, a method for measuring the three-dimensional shape of the inspection target object 4 is not limited to the space coding pattern projection method.

It is determined whether an exposure time during image capturing is set to an integral multiple of a flickering period from an exposure time with which an exposure amount appropriate for shape measurement is obtained, an average luminous intensity per unit time of a flickering light source, and a luminous intensity of illumination light. When the exposure time is set to the integral multiple of the flickering period, a light emission amount of the illumination light during the exposure time is adjusted to be an exposure amount appropriate for measurement.

Figure 2:
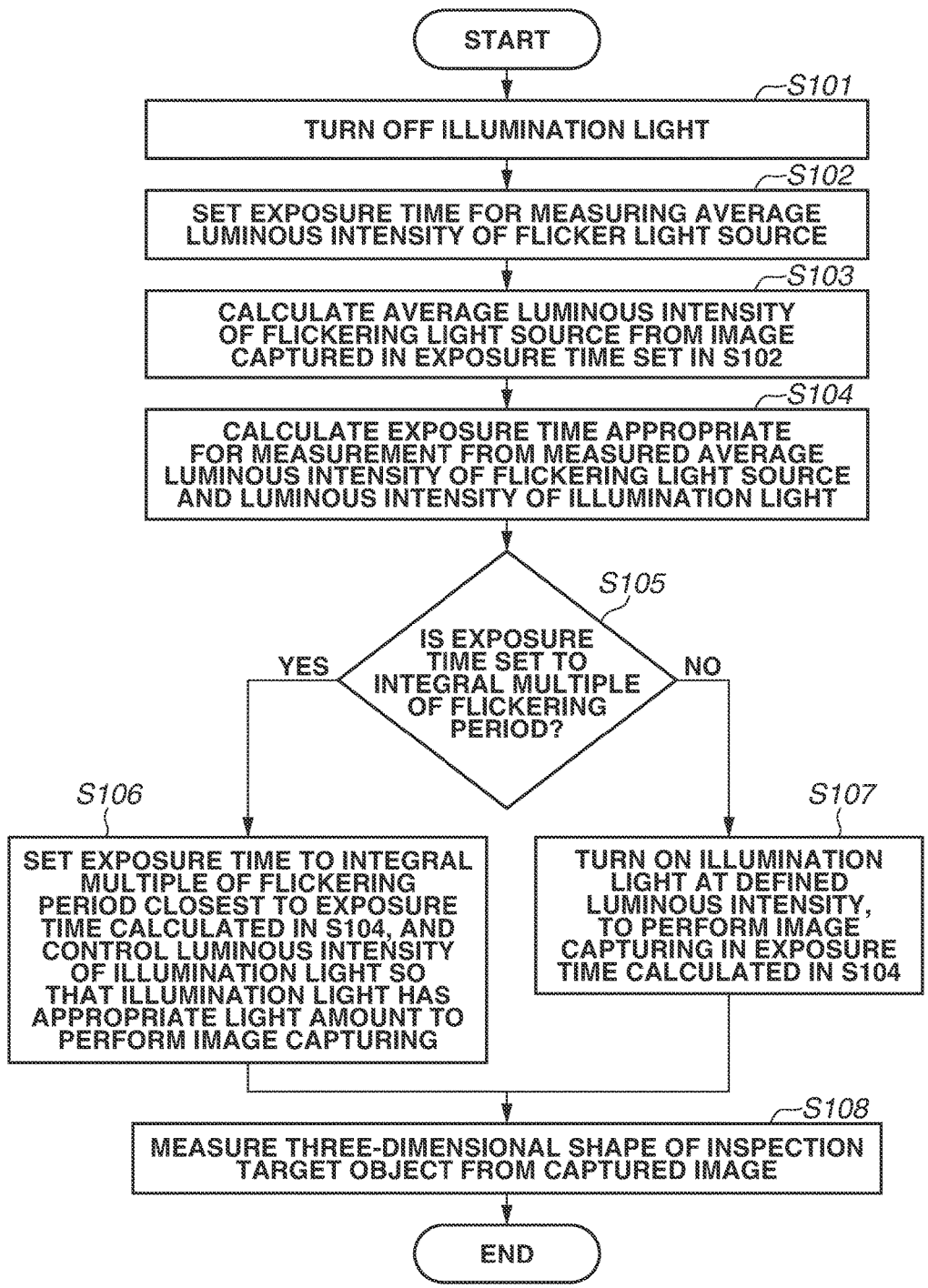
FIG. 2 illustrates a processing flowchart according to a first exemplary embodiment of the present disclosure.

FIG. 2 is a flowchart illustrating a processing procedure performed by the information processing apparatus 7 according to a first exemplary embodiment of the present disclosure.

In step S101, the light source control unit 7a turns off illumination light to measure an average luminous intensity of a flickering light source.

In step S102, the image sensor control unit 7c sets an exposure time for measuring the average luminous intensity of the flickering light source. A flicker, generated depending on a power supply frequency, caused by a fluorescent lamp of a non-inverter type has a frequency of two times the power supply frequency. Therefore, the exposure time is set to 10 msec in an area with a power supply frequency of 50 Hz, and is set to 8.3 msec in an area with a power supply frequency of 60 Hz. If the power supply frequency has been previously known, the exposure time may be set accordingly. However, if the power supply frequency is unknown, an appropriate exposure time can be known in a procedure illustrated in FIG. 3.

In step S102-1 illustrated in FIG. 3, the image sensor control unit 7c causes the image capturing apparatus 9 to capture a plurality of images at an unequal interval in an exposure time of 10 msec serving as one period of a flicker when the power supply frequency is 50 Hz with the illumination light turned off. When a capturing interval between the images is the unequal interval, a flicker frequency can be correctly determined even if a frame rate of the image sensor 6 is an integral multiple of the flicker frequency.

In step S102-2, the analysis unit 7d calculates a variation $\sigma_{10msec}$ among respective luminance values in regions of interest of the plurality of captured images.

In step S102-3, the image sensor control unit 7c causes the image capturing apparatus 9 to capture a plurality of images at an unequal interval in an exposure time of 8.3 msec serving as a flickering period when the power supply frequency is 60 Hz with the illumination light turned off. The order of the image capturing in the exposure time of 10 msec and the image capturing in the exposure time of 8.3 msec may be reversed.

In step S102-4, the analysis unit 7d calculates a variation $\sigma_{8.3msec}$ among respective luminance values in regions of interest of the plurality of captured images.

In step S102-5, the analysis unit 7d compares the variation $\sigma_{10msec}$ and the variation $\sigma_{8.3msec}$ to determine which of the variations is smaller, and sets the exposure time with the smaller variation to an exposure time for measuring the average luminous intensity of the flickering light source. With this operation, the flickering period dependent on a power supply frequency can be specified even if the power supply frequency has not been previously known.

In step S103 illustrated in FIG. 2, the image sensor control unit 7c performs image capturing in the exposure time, which has been set in step S102, with the illumination light turned off, and the analysis unit 7d calculates an average luminous intensity per unit time of the flickering light source from a luminance of an acquired image. At this time, the luminous intensity can be calculated by the following equation 1:

$$I_{flicker} = L/(G \times T) \qquad \text{(Equation 1)}$$

Here, $I_{flicker}$ is a luminous intensity of the flicker, L is an image luminance value, G is a gain of the image sensor 6, and T is an exposure time. The gain G of the image sensor 6 is adjusted so that the image luminance value L is not saturated to correctly measure the luminous intensity $I_{flicker}$ of the flicker. The image luminance value L may include a luminance value in a specific portion of a captured image and an average luminance value of the entire image.

In step S104, the image sensor control unit 7c calculates an exposure time serving as a luminance value of an image suitable for shape measurement of the inspection target object 4 from the average luminous intensity of the flickering light source, which has been measured in step S103, and the luminous intensity of the illumination light. An image having an appropriate luminance value is used to reduce effects of shot noise of the image sensor 6 and noise due to disturbance and avoid saturation of the luminance value to implement high-accuracy shape measurement. When the luminance value of the image, which is defined from an accuracy appropriate for shape measurement, is $L_{ideal}$, an exposure time $T_{measure}$ to obtain the luminance value is expressed by the following equation:

$$T_{measure} = L_{ideal}/G \times (I_{flicker} + I_{illumination}) \qquad \text{(Equation 2)}$$

G is a gain of the image sensor 6, $I_{flicker}$ is an average luminous intensity per unit time of the flickering light source, and $I_{illumination}$ is a luminance intensity of the illumination light. If the luminous intensity of the illumination light is unknown, the luminous intensity $I_{illumination}$ of the illumination light can be calculated using the following equation from a luminance value of an image captured in the exposure time that has been used in step S103:

$$I_{illumination} = L_{measure}/G \times T_{measure} - I_{flicker} \qquad \text{(Equation 3)}$$

Here, $I_{measure}$ is a measured image luminance. When the luminous intensity $I_{illumination}$ of the illumination light is measured, the luminance value of the image varies under the effect of the flicker. Therefore, a plurality of images is desirably captured to use an average of respective luminance values in regions of interest of the images as $L_{measure}$.

In step S105, the analysis unit 7d determines whether the exposure time for image capturing is set to an integral multiple of the flickering period from the average luminous intensity of the flickering light source, which has been measured in step S103, and the luminous intensity of the illumination light and the exposure time that has been calculated in step S104. The determination is performed based on a ratio of the average luminous intensity of the flickering light source, which has been measured in step S103, and the luminous intensity of the illumination light and the exposure time appropriate for the measurement that has been calculated in step S104.

Figure 5:
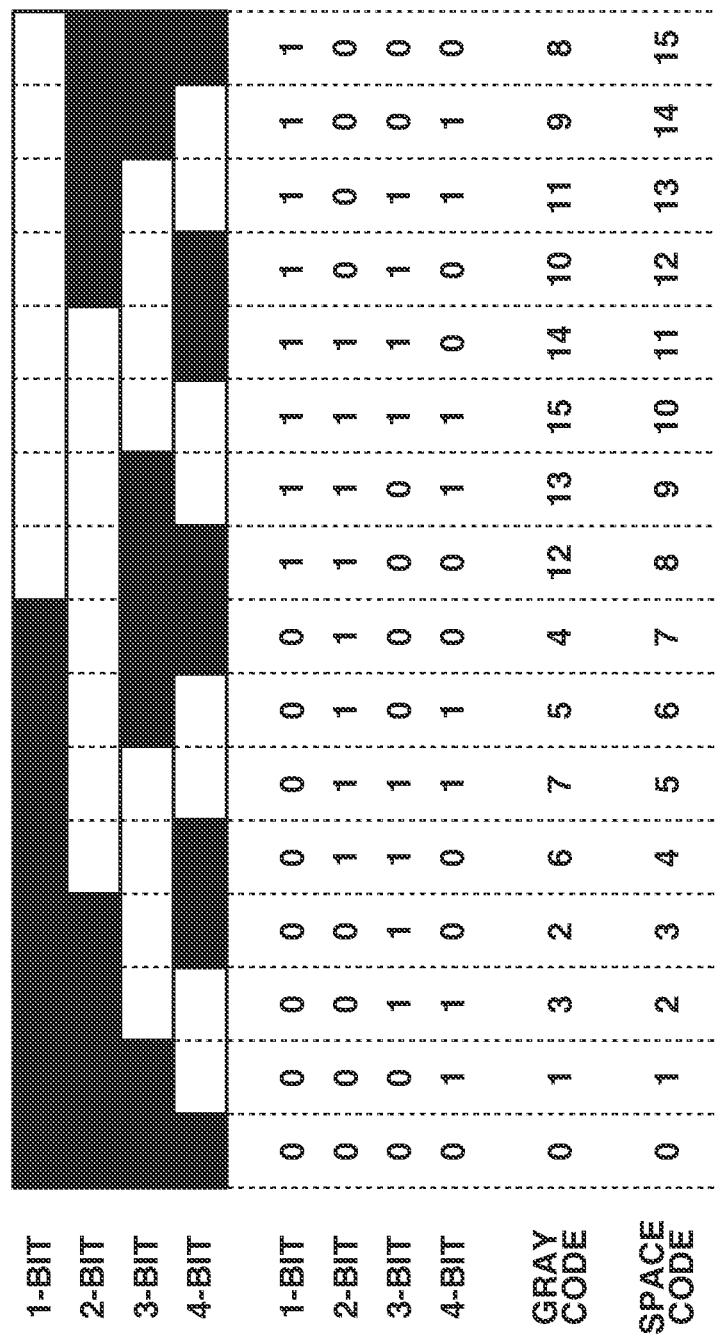
FIG. 5 illustrates a space code in the shape measurement method according to an exemplary embodiment of the present disclosure.

In the space coding pattern projection method serving as the three-dimensional measurement method in the present exemplary embodiment, patterns to be projected include patterns as illustrated in FIGS. 4A to 4J to be sequentially projected. In this example, the pattern to be projected is a 4-bit gray code pattern in the space coding pattern projection method. In the space coding pattern projection method, light and dark determination is performed from luminance information about a pattern light intensity image corresponding to each of bits, to add a space code for each region of an image capturing range. The light and dark determination is performed in the pattern light intensity image corresponding to the first bit, for example. In the light and dark determination performed when a space code is added, at the respective same pixels in a positive pattern image illustrated in FIG. 4B and a negative pattern image illustrated in FIG. 4G, an average value of a luminance of the positive pattern image and a luminance of the negative pattern image is set as a threshold value, and pixels lighter and darker than the threshold value are respectively determined to be 1 and 0, to add the space code. This is performed for the pattern light intensity image corresponding to each of the bits. When this is performed for the pattern light intensity images corresponding to the first to fourth bits, the space code can be added, as illustrated in FIG. 5. A shape of the inspection target object 4 is calculated from the added space code and a geometrical relationship between the pattern generation unit 2 and the image sensor 6.

In such a case, when the flickering light source exists in a measurement environment, luminance values during positive pattern irradiation and during negative pattern irradiation at the same pixel vary. The light and dark determination cannot be correctly performed depending on a combination of the average luminous intensity of the flickering light source, the luminous intensity of the illumination light, and the exposure time. Therefore, the three-dimensional shape of the inspection target object 4 may not be correctly measurable. When a variation in an image luminance value due to the flickering light source becomes approximately 5%, space coding becomes less erroneous depending on the inspection target object 4 and a measurement state.

Figure 6:
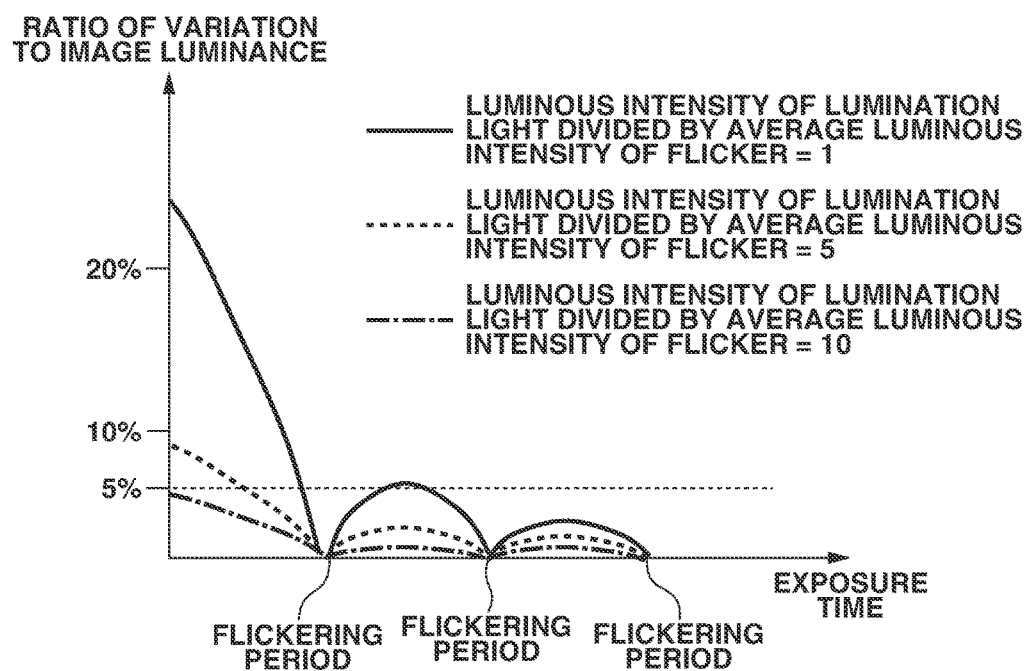
FIG. 6 illustrates an example of a variation in luminance in a captured image under flickering ambient light.

FIG. 6 illustrates a variation in luminance in a captured image under flickering ambient light. If a luminous intensity of illumination light divided by an average luminous intensity of a flicker is 10 or more, as indicated by a dashed-dotted line in FIG. 6, a variation in luminance value of an image to be captured in any exposure time also becomes less than 5% of an image luminance value averagely obtained in the exposure time. Therefore, if the luminous intensity of the illumination light divided by the average luminous intensity of the flicker is 10 or more, it is determined that the exposure time is not set to the integral multiple of the flickering period (NO in step S105), and the processing proceeds to step S107.

On the other hand, if the luminous intensity of the illumination light divided by the average luminous intensity of the flicker is less than 10, it is determined that the exposure time is set to the integral multiple of the flickering period (YES in step S105), and the processing proceeds to step S106. In step S106, the image sensor control unit 7c sets an exposure time, which is the integral multiple of the flickering period, closest to the exposure time that has been calculated in step S104, and controls a light amount of the illumination light so that an appropriate image luminance is obtained in the set exposure time that is the integral multiple of the flickering period, to perform image capturing. In the present exemplary embodiment, a case where the light amount of the illumination light is controlled by controlling the luminance intensity (projection intensity) will be described. When an exposure time set to reduce the variation in the image luminance value due to the flicker is $T_{antiflicker}$, a luminous intensity $I'_{illumination}$ of the illumination light to obtain an appropriate exposure amount is expressed by the following equation:

$$I'_{illumination} = \frac{T_{measure}}{T_{antiflicker}} \times (I_{flicker} + I_{illumination}) - I_{flicker} \qquad \text{(Equation 4)}$$

Here, G is a gain of the image sensor 6, $I_{flicker}$ is an average luminous intensity per unit time of the flickering light source, $T_{measure}$ is an exposure time that has been calculated in step S103, and $I_{illumination}$ is a luminance intensity of the illumination light before control. When the luminous intensity of the illumination light divided by the average luminous intensity of the flickering light source is 1, and an appropriate exposure time is 7.5 msec (0.75 times of the flickering period), the exposure time is set to 10 msec (at a flicker frequency of 100 Hz). The luminous intensity of the illumination light is expressed by the following equation 5 from the equation 4:

$$I'_{illumination} = 0.25 \times I_{illumination} \qquad \text{(Equation 5)}$$

The light source is controlled by the light source control unit 7a so that the luminous intensity of the illumination light is obtained, to perform image capturing.

On the other hand, if the exposure time is not set to the integral multiple of the flickering period (NO in step S105), the processing proceeds to step S107. In step S107, the image sensor control unit 7c performs image capturing based on the exposure time, which has been calculated in step S104, and the luminous intensity $I_{illumination}$ of the illumination light.

In step S108, the analysis unit 7d then measures a three-dimensional shape of the inspection target object 4 from an image that has been captured in step S106 or S107 (an image capturing result). The space coding pattern projection method is used as the shape measurement method in the present disclosure. Therefore, when the pattern light intensity images corresponding to the first to fourth bits are projected, as illustrated in FIG. 4A to 4J, the space code can be added, as illustrated in FIG. 5. A shape of the inspection target object 4 is calculated from the added space code and a geometrical relationship between the pattern generation unit 2 and the image sensor 6.

As described above, according to the present exemplary embodiment, three-dimensional measurement can be performed with high accuracy by appropriately controlling the exposure time even under an environment in which the flicker occurs.

(Modification)

In the first exemplary embodiment described above, it is determined whether the exposure time is set to the flickering period based on only the luminous intensity of the illumination light divided by the average luminous intensity of the flicker. However, the determination can also be made by combining the exposure time. Even if the luminous intensity of the illumination light divided by the average luminous intensity of the flicker is less than 10, e.g., 5, the variation in the image luminance value is less than 5% if the exposure time is more than one time of the flickering period. Therefore, as determination criteria for determining whether the exposure time is set to the flickering period, the luminous intensity of the illumination light divided by the average luminous intensity of the flicker can be set to 5 or more, and the exposure time can be set to one time or more of the flickering period. The determination criteria can be set based on a measurement method and an accuracy used for measurement. Therefore, numerical values listed above are examples.

In a second exemplary embodiment, a light amount of illumination light is controlled by controlling a lighting time (light emission time) of the illumination light.

An apparatus configuration to implement the present exemplary embodiment is similar to that in the first exemplary embodiment (FIG. 1). Respective functions of units are similar to those in the first exemplary embodiment.

Figure 7:
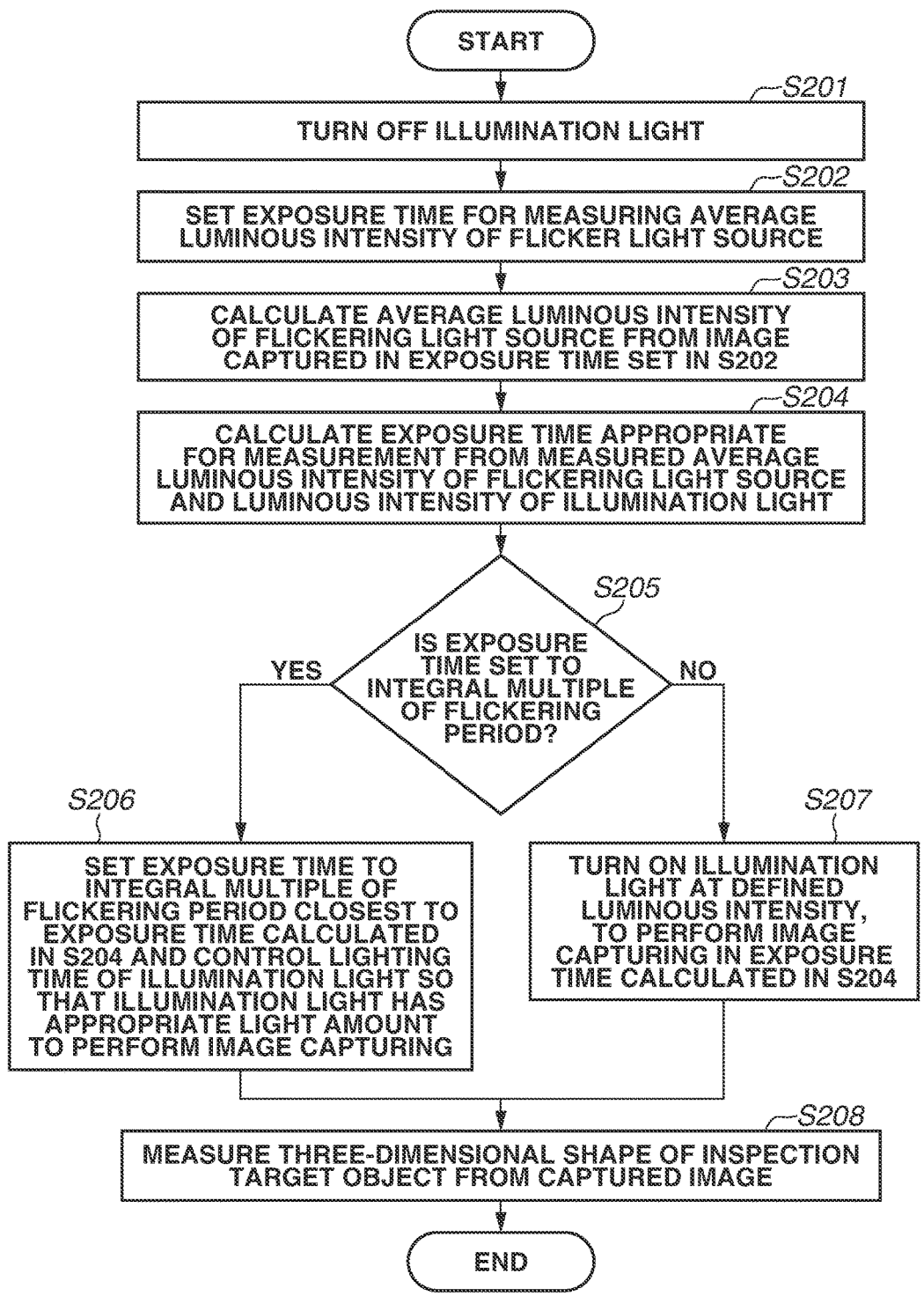
FIG. 7 is a processing flowchart according to a second exemplary embodiment of the present disclosure.

A measurement method according to the present exemplary embodiment is illustrated in FIG. 7. In step S201, a light source control unit 7a first turns off illumination light, like in the first exemplary embodiment.

In step S202, an image sensor control unit 7c sets an exposure time for measuring an average luminous intensity of a flickering light source, like in the first exemplary embodiment.

In step S203, the image sensor control unit 7c performs image capturing in the exposure time, which has been set in step S202, with the illumination light turned off, and an analysis unit 7d calculates an average luminous intensity per unit time of the flickering light source based on the equation 1 from a luminance of an acquired image.

In step S204, the image sensor control unit 7c calculates an exposure time serving as a luminance value of an image suitable for shape measurement of an inspection target object 4 based on the equation 2 from the average luminous intensity of the flickering light source, which has been measured in step S203, and the luminous intensity of the illumination light.

In step S205, the analysis unit 7d determines whether an exposure time for image capturing is set to an integral multiple of a flickering period from the average luminous intensity of the flickering light source, which has been measured in step S203, and the luminous intensity of the illumination light and the exposure time that has been calculated in step S204, to determine whether image capturing is performed by controlling the illumination light to obtain an appropriate light amount within the exposure time or image capturing is performed in the exposure time that has been calculated in step S204.

If the exposure time is set to the integral multiple of the flickering period (YES in step S205), the processing proceeds to step S206. In step S206, the image sensor control unit 7c sets an exposure time, which is the integral multiple of the flickering period, closest to the exposure time that has been calculated in step S204, and controls a light amount of the illumination light so that an appropriate image luminance is obtained in the set exposure time that is the integral multiple of the flickering period, to perform image capturing. In the present exemplary embodiment, a method for controlling the light amount of the illumination light using the lighting time of the illumination light will be described. When an exposure time set to reduce a variation in an image luminance value due to a flicker is $T_{antiflicker}$, a lighting time $T_{illumination}$ of the illumination light to obtain an appropriate exposure amount is expressed by the following equation:

$$T_{illumination} = \frac{1}{I_{illumination}} \times \qquad \text{(Equation 6)}$$
$$(T_{measure} \times (I_{flicker} + I_{illumination}) - I_{flicker} \times T_{antiflicker})$$

Here, G is a gain of an image sensor 6, $I_{flicker}$ is an average luminous intensity per unit time of the flickering light source, $T_{measure}$ is an exposure time that has been calculated in step S203, and $I_{illumination}$ is a luminance intensity of the illumination light before control. An exposure time itself for image capturing enables a similar effect to that in the first exemplary embodiment to be obtained when the exposure time set to reduce the variation in the image luminance value due to the flicker is $T_{antiflicker}$ and the lighting time of the illumination light during exposure is $T_{illumination}$. A lighting timing of the illumination light during the exposure may be any timing during the exposure. The illumination light may repeatedly turned on and off in a predetermined period so that the lighting time satisfies $T_{illumination}$.

On the other hand, if the exposure time is not set to the integral multiple of the flickering period (No in step S205), the processing proceeds to step S207. In step S207, the image sensor control unit 7c performs image capturing based on the exposure time, which has been calculated in step S204, and the luminous intensity $I_{illumination}$ of the illumination light and the lighting time $T_{illumination}$ of the illumination light.

In step S208, the analysis unit 7d measures a three-dimensional shape of the inspection target object 4 from an image that has been captured in step S206 or S207, like in the first exemplary embodiment. A space coding pattern projection method is used as the shape measurement method in the present disclosure. Therefore, when pattern images corresponding to the first to fourth bits are projected, as illustrated in FIG. 4A to 4J, a space code can be added, as illustrated in FIG. 5. A shape of the inspection target object 4 is calculated from the added space code and a geometrical relationship between a pattern generation unit 2 and the image sensor 6.

The method described above enables an effect of the flicker to be kept to a minimum to measure the shape of the inspection target object 4 with high accuracy.

Thus, according to the present exemplary embodiment, an exposure amount is controlled by the lighting time without controlling the light amount of the illumination light. Therefore, the effect of the flicker is reduced even when the light amount of the illumination light cannot be controlled, thereby enabling high-accuracy three-dimensional measurement.

In the first and second exemplary embodiments, it is determined whether the exposure time is set to the integral multiple of the flickering period based on the luminous intensity of the illumination light divided by the average luminous intensity of the flicker. However, in an actual measurement field, the luminous intensity of the illumination light may be higher than the average luminous intensity of the flicker. Therefore, in a third exemplary embodiment, it is determined whether an exposure time is set to an integral multiple of a flickering period without considering a luminous intensity of illumination light divided by an average luminous intensity of a flicker but based on only the exposure time when the luminous intensity of the illumination light has been previously known to be sufficiently higher than a luminous intensity of a flickering light source.

Figure 8:
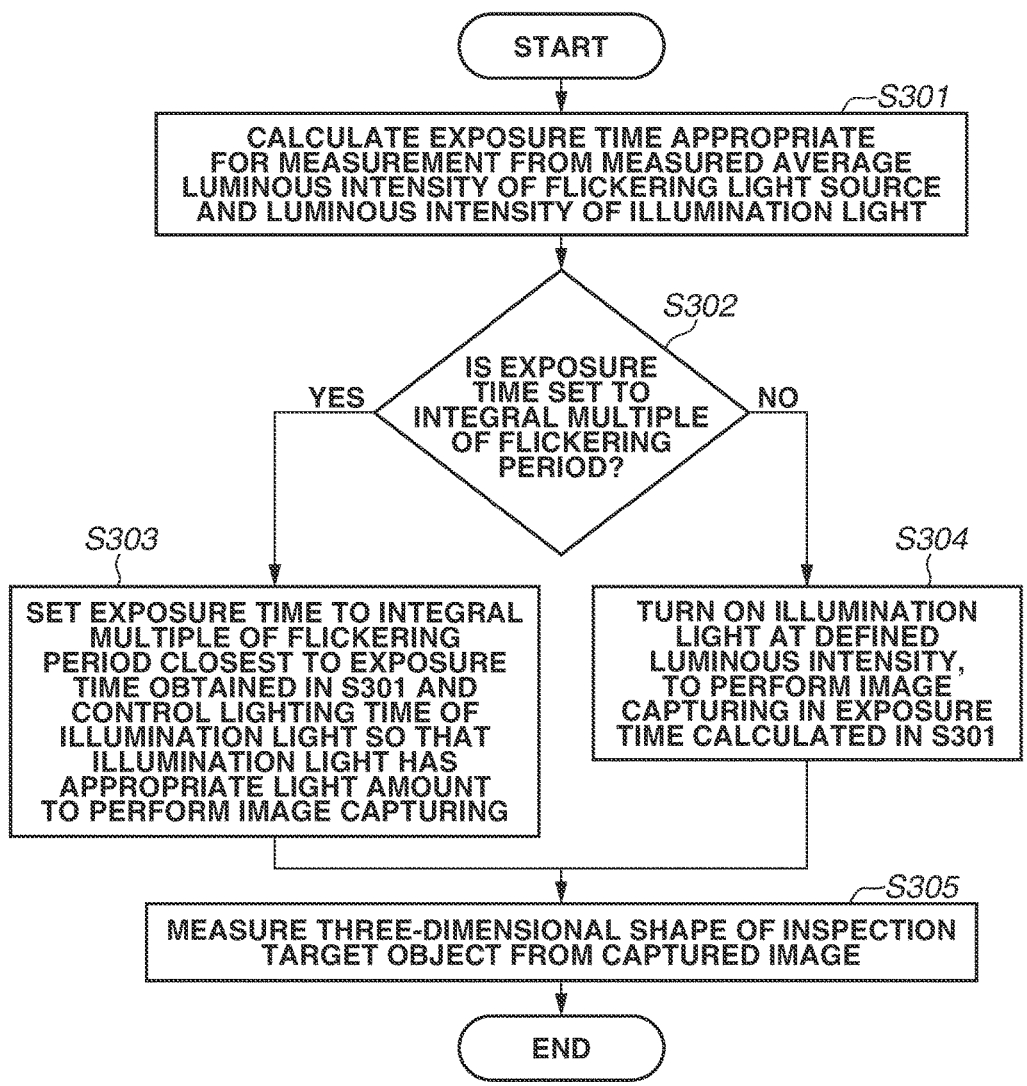
FIG. 8 is a processing flowchart according to a third exemplary embodiment of the present disclosure.

FIG. 8 is a flowchart illustrating processing in the present exemplary embodiment.

In step S301, an image sensor control unit 7c calculates an exposure time $T_{measure}$. In the present exemplary embodiment, an average luminous intensity of a flicker is not measured. Therefore, an image is captured not based on the equation 3 but while the exposure time $T_{measure}$ is changed, and an optimum exposure time $T_{measure}$ in which a luminance of a target portion in the captured image becomes an optimum luminance is obtained.

In step S302, the analysis unit 7d determines whether an exposure time is set to an integral multiple of a flickering period based on the exposure time $T_{measure}$ that has been obtained in step S301.

As illustrated in FIG. 6, when the exposure time is more than two times of the flickering period, a variation in an image luminance is less than 5%, except for an environment in which a luminous intensity of illumination light becomes lower than an average luminous intensity of a flickering light source. Therefore, if the exposure time $T_{measurer}$ which has been obtained in step S301, is more than two times of the flickering period, it is determined that the exposure time is not set to the integral multiple of the flickering period (NO in step S302), and the processing proceeds to step S304. On the other hand, if the exposure time is less than two times of the flickering period, it is determined that the exposure time is set to the integral multiple of the flickering period (YES in step S302), and the processing proceeds to step S303. Criteria for the determination are set based on a measurement method and an accuracy used for measurement.

In step S303, an image sensor control unit 7c controls a light amount of the illumination light so that an appropriate image luminance is obtained in the exposure time that is the integral multiple of the flickering period, to perform image capturing, like in the first exemplary embodiment. A lighting time of the illumination light may be controlled, like in the second exemplary embodiment.

In step S304, the image sensor control unit 7c performs image capturing based on the exposure time $T_{measurer}$ which has been obtained in step S301, because the exposure time need not be changed to the integral multiple of the flickering period.

In step S305, an analysis unit 7d measures a three-dimensional shape of the inspection target object 4 from an image that has been captured in step S303 or S304, like in the first exemplary embodiment.

Thus, according to the present exemplary embodiment, the average luminous intensity of the flicker need not be measured. Therefore, it is determined whether the exposure time is set to the integral multiple of the flickering period in a short time, thereby enabling high-speed and high-accuracy three-dimensional measurement.

Adjustment of the intensity of light emitted by the light source 1 and the time when the light is emitted has been described above in the present specification. However, the present disclosure is not limited thereto. For example, a luminous intensity and a light emission time of a pattern actually projected from the projection apparatus via the projection lens 3a and 3b may be adjusted by shielding the pattern from light using a mask while the intensity of the light emitted by the light source 1 and the time when the light is emitted are fixed. More specifically, in the present specification, the luminous intensity and the light emission time include not only the intensity of light emitted by the light source 1 and the time when the light is emitted but also the luminous intensity and the light emission time of the pattern actually projected from the projection apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-123161, filed Jun. 18, 2015, which is hereby incorporated by reference herein in its entirety.

What is claimed is:

1. An information processing apparatus configured to perform three-dimensional measurement of a target object by capturing a plurality of images of the target object, onto which a plurality of patterns is projected by a projection apparatus, the information processing apparatus comprising:
at least one processor configured to function as:
a set unit configured to set a luminous intensity and a light emission time of the plurality of patterns projected by the projection apparatus to a first luminous intensity and a first light emission time, and configured to set an exposure time of the image capturing apparatus in capturing each of the plurality of images of the target object by the image capturing apparatus to a first exposure time based on the first luminous intensity;
a determination unit configured to determine whether the exposure time of the image capturing apparatus is set to an integral multiple of a flickering period of ambient light based on a variation between each luminance value of the plurality of images captured by an image capturing apparatus under the ambient light;
a control unit configured to perform control to set the exposure time to a second exposure time of the integral multiple of the flickering period of the ambient light near the first exposure time, and control to set the luminous intensity or the light emission time of the plurality of patterns projected by the projection apparatus to a second luminous intensity or a second light emission time based on the second exposure time in a case where the determination unit determines that the exposure time of the image capturing apparatus is set to the integral multiple of the flickering period of the ambient light; and
a measurement unit configured to perform the three-dimensional measurement of the target object using the plurality of images of the target object captured by an image capturing apparatus by projecting the plurality of patterns by the projection apparatus and capturing the plurality of images by the image capturing apparatus in the first exposure time, the first luminous intensity and the first light emission time set by the set unit when the exposure time is not set to the integral multiple of the flickering period of the ambient light, and configured to perform the three-dimensional measurement of the target object based on the plurality of images of the target object captured by an image capturing apparatus by projecting the plurality of patterns by the projection apparatus and capturing the plurality of images by the image capturing apparatus in the second exposure time and the second luminous intensity or the second light emission time set by the control unit when the exposure time is set to the integral multiple of the flickering period of the ambient light.

2. The information processing apparatus according to claim 1, wherein the control unit sets the second luminous intensity or the second light emission time of the patterns so that a desired luminance is obtained in an image captured in the second exposure time set to the integral multiple of the period of the ambient light.

3. The information processing apparatus according to claim 1, wherein the control unit does not change the exposure time of the image capturing apparatus when the determination unit does not determine that the exposure time of the image capturing apparatus is set to the integral multiple of the flickering period of the ambient light.

4. The information processing apparatus according to claim 1, wherein the determination unit performs the determination based on the first luminous intensity of the projected pattern.

5. The information processing apparatus according to claim 1, wherein the determination unit performs the determination based on a luminous intensity of the ambient light.

6. The information processing apparatus according to claim 5, further comprising a luminous intensity measurement unit configured to measure the luminous intensity of the ambient light,
wherein the determination unit performs the determination based on the luminous intensity of the ambient light measured by the luminous intensity measurement unit.

7. The information processing apparatus according to claim 1, wherein the determination unit performs the determination based on the first exposure time.

8. The information processing apparatus according to claim 7, wherein the determination unit sets, when the first exposure time is less than a predetermined multiple of the flickering period of the ambient light, the exposure time of the image capturing apparatus to the integral multiple of the flickering period of the ambient light.

9. The information processing apparatus according to claim 1, wherein the determination unit performs the determination based on at least one of the luminous intensity of the projected pattern, the luminous intensity of the ambient light, and the exposure time currently set in the image capturing apparatus.

10. The information processing apparatus according to claim 1, wherein the pattern is a space coding pattern having light and dark portions.

11. A method for controlling an information processing apparatus configured to perform three-dimensional measurement of a target object by capturing a plurality of images of the target object, onto which a plurality of patterns is projected by a projection apparatus, the method comprising:
setting a luminous intensity and a light emission time of the plurality of patterns projected by the projection apparatus to a first luminous intensity and a first light emission time, and setting an exposure time of the image capturing apparatus in capturing each of the plurality of images of the target object by the image capturing apparatus to a first exposure time based on the first luminous intensity;
determining whether the exposure time of the image capturing apparatus is set to an integral multiple of a flickering period of ambient light based on a variation between each luminance value of the plurality of images captured by an image capturing apparatus under the ambient light;

performing control to set the exposure time to a second exposure time of the integral multiple of the flickering period of the ambient light near the first exposure time, and control to set the luminous intensity or the light emission time of the plurality of patterns projected by the projection apparatus to a second luminous intensity or a second light emission time based on the second exposure time in a case where the exposure time of the image capturing apparatus is determined to be set to the integral multiple of the flickering period of the ambient light; and performing the three-dimensional measurement of the target object using the plurality of images of the target object captured by an image capturing apparatus by projecting the plurality of patterns by the projection apparatus and capturing the plurality of images by the image capturing apparatus in the first exposure time, the first luminous intensity and the first light emission time set by the set unit when the exposure time is not set to the integral multiple of the flickering period of the ambient light, and configured to perform the three-dimensional measurement of the target object based on the plurality of images of the target object captured by an image capturing apparatus by projecting the plurality of patterns by the projection apparatus and capturing the plurality of images by the image capturing apparatus in the second exposure time and the second luminous intensity or the second light emission time set when the exposure time is set to the integral multiple of the flickering period of the ambient light.

12. A storage medium storing a program for causing a computer to function as each unit comprised in an information processing apparatus configured to perform three-dimensional measurement of a target object by capturing a plurality of images of the target object, onto which a plurality of patterns is projected by a projection apparatus, the information processing apparatus comprising:

a set unit configured to set a luminous intensity and a light emission time of the plurality of patterns projected by the projection apparatus to a first luminous intensity and a first light emission time, and configured to set an exposure time of the image capturing apparatus in capturing each of the plurality of images of the target object by the image capturing apparatus to a first exposure time based on the first luminous intensity;

a determination unit configured to determine whether the exposure time of the image capturing apparatus is set to an integral multiple of a flickering period of ambient light based on a variation between each luminance value of the plurality of images captured by an image capturing apparatus under the ambient light;

a control unit configured to perform control to set the exposure time to a second exposure time of the integral multiple of the flickering period of the ambient light near the first exposure time, and control to set the luminous intensity or the light emission time of the plurality of patterns projected by the projection apparatus to a second luminous intensity or a second light emission time based on the second exposure time in a case where the exposure time of the image capturing apparatus is determined to be set to the integral multiple of the flickering period of the ambient light; and a measurement unit configured to perform three-dimensional measurement of the target object using the plurality of images of the target object captured by an image capturing apparatus by projecting the plurality of patterns by the projection apparatus and capturing the plurality of images by the image capturing apparatus in the first exposure time, the first luminous intensity and the first light emission time set by the set unit when the exposure time is not set to the integral multiple of the flickering period of the ambient light, and configured to perform the three-dimensional measurement of the target object based on the plurality of images of the target object captured by an image capturing apparatus by projecting the plurality of patterns by the projection apparatus and capturing the plurality of images by the image capturing apparatus in the second exposure time and the second luminous intensity or the second light emission time set by the control unit when the exposure time is set to the integral multiple of the flickering period of the ambient light.

* * * * *